(12) United States Patent
Orkiszewski

(10) Patent No.: US 10,502,096 B2
(45) Date of Patent: Dec. 10, 2019

(54) BEARING DAMPER FOR COLD ENGINE GROUND STARTS OR IN-FLIGHT RE-STARTS

(71) Applicant: General Electric Company, Schenectady, NY (US)

(72) Inventor: Charles Stanley Orkiszewski, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 15/843,588

(22) Filed: Dec. 15, 2017

(65) Prior Publication Data

US 2019/0186296 A1 Jun. 20, 2019

(51) Int. Cl.
*F01D 25/16* (2006.01)
*F01D 25/18* (2006.01)
*F16C 27/04* (2006.01)

(52) U.S. Cl.
CPC ........... *F01D 25/164* (2013.01); *F01D 25/18* (2013.01); *F16C 27/045* (2013.01); *F05D 2220/323* (2013.01); *F05D 2240/50* (2013.01); *F05D 2260/98* (2013.01); *F05D 2270/303* (2013.01); *F05D 2270/42* (2013.01); *F05D 2270/44* (2013.01); *F16C 2326/43* (2013.01); *F16C 2360/23* (2013.01)

(58) Field of Classification Search
CPC ........ F01D 25/164; F01D 25/18; F01D 25/16; F01D 19/02; F16C 27/045; F16C 2360/23; F16C 27/02; F16C 19/06; F16C 19/525; F16C 19/527; F16C 15/0237; F16F 15/0237; F16F 2222/12; F05D 2220/32; F05D 2260/98; F05D 2220/323; F05D 2240/50; F05D 2270/303; F05D 2270/42; F05D 2270/44
See application file for complete search history.

(56) References Cited

U.S. PATENT DOCUMENTS

| | | | | |
|---|---|---|---|---|
| 2,669,094 A | * | 2/1954 | Lee, II | F02C 9/16 251/56 |
| 2,750,734 A | * | 6/1956 | Imbert | F02K 3/00 60/238 |
| 3,176,800 A | * | 4/1965 | Trupp | F16F 9/10 188/277 |

(Continued)

*Primary Examiner* — Bradley T King
*Assistant Examiner* — Mahbubur Rashid
(74) *Attorney, Agent, or Firm* — Dority & Manning, P.A.

(57) ABSTRACT

Dampers for bearing assemblies of gas turbine engines are provided. For example, a damper comprises a damper housing, a lubricant passage defined in the damper housing, and a valve positioned within the lubricant passage. The lubricant passage includes an inlet and an outlet. In one embodiment, the valve is configured to restrict a flow of lubricant from the inlet into the damper when a reference temperature is below a threshold temperature. In another embodiment, the valve is configured to increase leakage of a lubricant through the outlet when a reference temperature is below a threshold temperature. In other embodiments, the valve is passively actuated and is configured to move within the lubricant passage to control a flow of lubricant from the inlet to the outlet based on a reference temperature.

20 Claims, 3 Drawing Sheets

(56) References Cited

U.S. PATENT DOCUMENTS

| | | | | |
|---|---|---|---|---|
| 4,527,910 A * | 7/1985 | Fleming | F01D 25/164 | 384/101 |
| 4,669,893 A * | 6/1987 | Chalaire | F16F 15/0237 | 384/535 |
| 4,775,248 A * | 10/1988 | Barbic | F16F 15/0237 | 384/99 |
| 4,947,639 A * | 8/1990 | Hibner | F01D 25/164 | 384/535 |
| 4,983,051 A * | 1/1991 | Hibner | F01D 25/164 | 184/6.11 |
| 5,067,454 A * | 11/1991 | Waddington | F01D 25/20 | 123/196 AB |
| 5,067,825 A * | 11/1991 | Vance | F16F 15/0237 | 384/99 |
| 5,071,262 A * | 12/1991 | Monzel | F01D 25/164 | 384/581 |
| 5,110,257 A * | 5/1992 | Hibner | F01D 25/164 | 415/119 |
| 5,149,206 A * | 9/1992 | Bobo | F01D 25/164 | 248/562 |
| 5,169,241 A * | 12/1992 | Singh | F02D 9/16 | 251/309 |
| 5,215,384 A * | 6/1993 | Maier | F16F 9/52 | 188/277 |
| 5,890,699 A * | 4/1999 | Sugihara | F02D 9/16 | 251/309 |
| 5,901,821 A * | 5/1999 | Hanawa | F16F 9/52 | 188/277 |
| 6,135,639 A * | 10/2000 | Dede | F16C 27/045 | 384/581 |
| 6,568,688 B1 | 5/2003 | Boeck | | |
| 7,329,048 B2 * | 2/2008 | Klusman | F01D 25/125 | 384/99 |
| 7,431,504 B1 * | 10/2008 | Pelfrey | F01D 25/164 | 384/535 |
| 7,476,090 B2 | 1/2009 | Wood | | |
| 7,517,152 B1 * | 4/2009 | Walsh | F16C 23/08 | 384/99 |
| 7,665,897 B2 * | 2/2010 | Alam | F01D 25/164 | 384/474 |
| 8,684,606 B2 * | 4/2014 | Byrne | F16C 17/06 | 384/122 |
| 8,894,286 B2 * | 11/2014 | Nicholas | F16C 27/02 | 384/302 |
| 9,416,820 B2 | 8/2016 | Ertas et al. | | |
| 9,494,048 B1 | 11/2016 | Parnin | | |
| 9,599,019 B2 | 3/2017 | Muldoon et al. | | |
| 2007/0028964 A1 * | 2/2007 | Vasquez | F03G 7/065 | 137/457 |
| 2007/0031078 A1 | 2/2007 | Hackett | | |
| 2013/0192253 A1 * | 8/2013 | Ackermann | F01D 5/085 | 60/782 |
| 2015/0240867 A1 * | 8/2015 | Amador | F01D 25/164 | 384/535 |
| 2017/0058697 A1 | 3/2017 | Copeland et al. | | |
| 2017/0058909 A1 | 3/2017 | Barber et al. | | |
| 2017/0102003 A1 * | 4/2017 | Sishtla | F04D 17/122 | |
| 2017/0234158 A1 | 8/2017 | Savela | | |

* cited by examiner

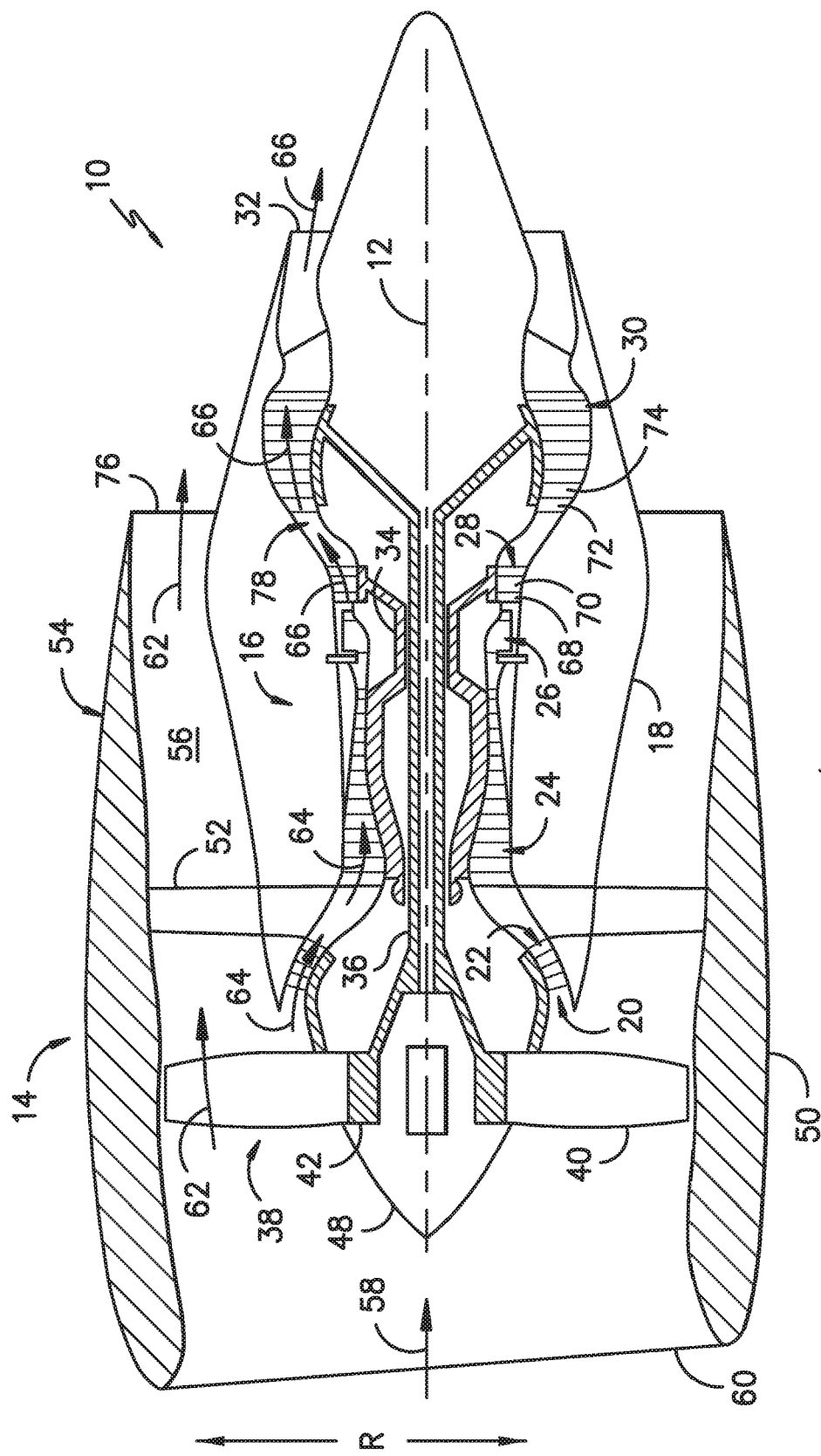
FIG. -1-

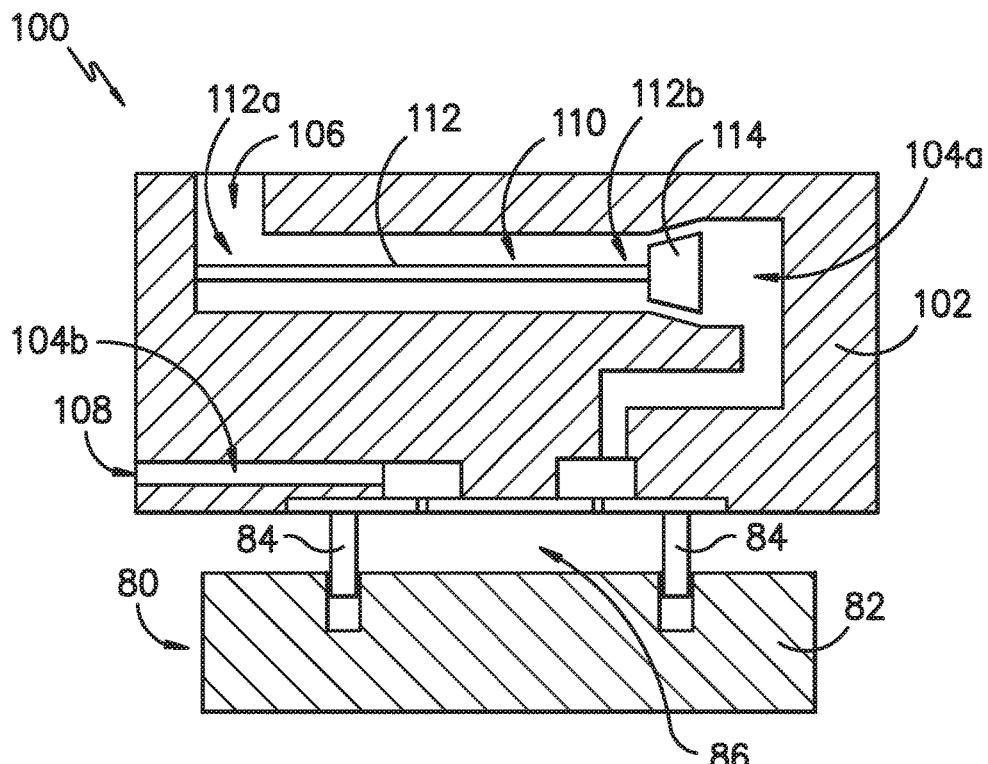
FIG. -2-
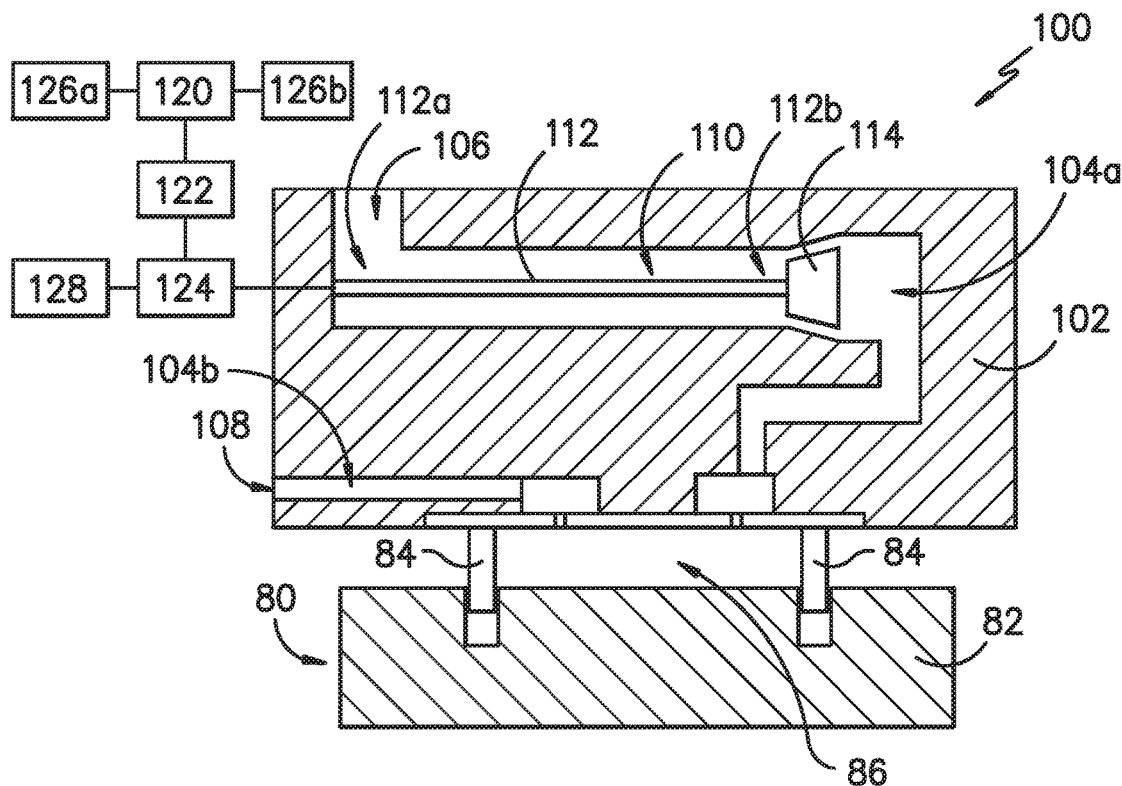
FIG. -3-

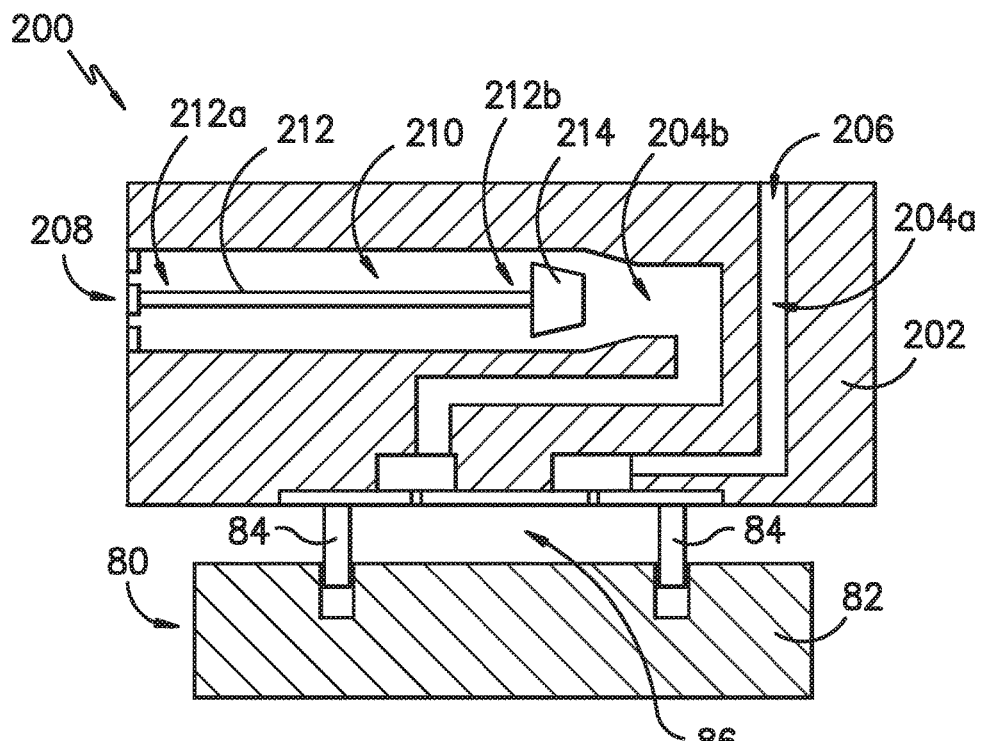
FIG. -4-
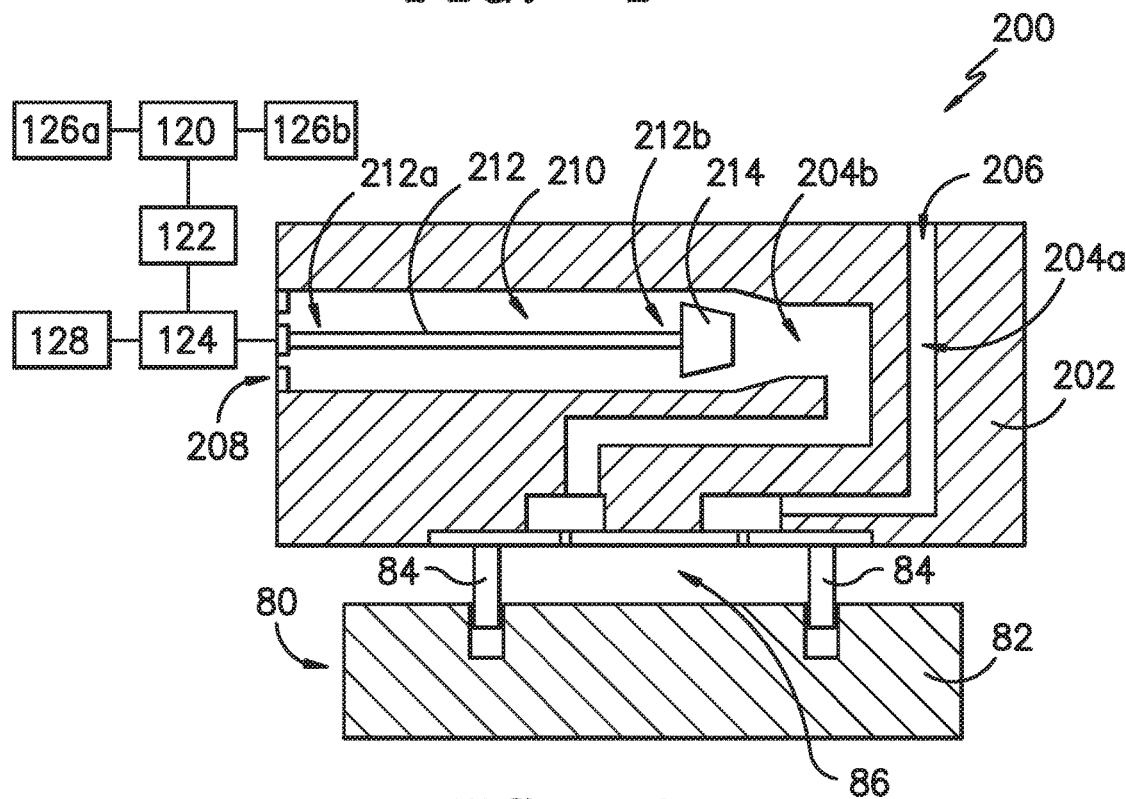
FIG. -5-

BEARING DAMPER FOR COLD ENGINE GROUND STARTS OR IN-FLIGHT RE-STARTS

FIELD

The present subject matter relates generally to gas turbine engines and, more particularly, to bearing dampers for gas turbine engines. Most particularly, the present subject matter relates to bearing dampers with features for managing cold oil at start up or re-starts of a gas turbine engine.

BACKGROUND

Gas turbine engines typically include a rotor assembly, a compressor, and a turbine. In turbofan engines, the rotor assembly includes a fan having an array of fan blades extending radially outwardly from a rotor shaft. The rotor shaft, which transfers power and rotary motion from the turbine to both the compressor and the fan, is supported longitudinally using a plurality of bearing assemblies. Known bearing assemblies include one or more rolling elements supported within a paired race. To maintain a rotor critical speed margin, the rotor assembly is typically supported on three bearing assemblies: one thrust bearing assembly and two roller bearing assemblies. The thrust bearing assembly supports the rotor shaft and minimizes axial and radial movement thereof, while the roller bearing assemblies support radial movement of the rotor shaft.

Usually, these bearing assemblies include dampers, e.g., for damping rotor vibrations. A common damper is a fluid film or squeeze film damper, which provides a thin film of a lubricant, such as oil, within the bearing assembly that resists whirling and/or other motion of the bearing, e.g., to compensate for rotor imbalance and dissipate rotor vibrations. Such dampers function best when the lubricant has a relatively low viscosity, e.g., when the oil is relatively warm. However, when the lubricant is cold (for instance, due to a cold engine or low ambient air temperatures), it is relatively highly viscous and negatively impacts the performance of the damper. Therefore, it is common to require the engine to idle for a specified amount of time upon a cold engine start or in-flight re-start to allow the lubricant to warm up such that the dampers may perform as intended. Further, the dampers may be designed to compensate for cold lubricant conditions, such that known damper designs are sub-optimal.

Accordingly, a bearing damper for a gas turbine engine that allows reduction or elimination of time-at-idle and/or optimization of the damper configuration would be welcomed in the technology.

BRIEF DESCRIPTION

Aspects and advantages of the invention will be set forth in part in the following description, or may be obvious from the description, or may be learned through practice of the invention.

In one exemplary embodiment of the present subject matter, a damper for a bearing assembly of a gas turbine engine is provided. The damper comprises a damper housing, a lubricant passage defined in the damper housing, and a valve positioned within the lubricant passage. The lubricant passage includes an inlet and an outlet. The valve is configured to restrict a flow of lubricant from the inlet into the damper when a reference temperature is below a threshold temperature.

In another exemplary embodiment of the present subject matter, a damper for a bearing assembly of a gas turbine engine is provided. The damper comprises a damper housing, a lubricant passage defined in the damper housing, and a valve positioned within the lubricant passage. The lubricant passage includes an inlet and an outlet. The valve is configured to increase leakage of a lubricant through the outlet when a reference temperature is below a threshold temperature.

In a further exemplary embodiment of the present subject matter, a damper for a bearing assembly of a gas turbine engine is provided. The damper comprises a damper housing, a lubricant passage defined in the damper housing, and a passively actuated valve positioned within the lubricant passage. The lubricant passage includes an inlet and an outlet. The valve is configured to move within the lubricant passage to control a flow of lubricant from the inlet to the outlet based on a reference temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine, according to various embodiments of the present subject matter.

FIGS. 2, 3, 4, and 5 provide schematic cross-sectional views of dampers for a bearing assembly of the gas turbine engine of FIG. 1, according to various exemplary embodiments of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. Further, with respect to engine embodiments described herein, the terms "fore" and "aft" generally refer to a position in relation to an ambient air inlet and an engine exhaust nozzle of the engine.

The exemplary apparatus and methods described herein overcome at least some disadvantages of known dampers for bearing assemblies, for example, for use in gas turbine engines. In some embodiments, a damper for a bearing assembly includes a valve positioned in a lubricant passage defined in a damper housing, and the valve is configured to restrict a flow of lubricant from the inlet into the damper when a reference temperature is below a threshold temperature. In other embodiments, a damper for a bearing assembly includes a valve positioned in a lubricant passage defined in a damper housing, and the valve is configured to increase leakage of a lubricant through the outlet when a reference temperature is below a threshold temperature. Preferably, the lubricant is oil and the damper provides a thin film of the oil within the bearing assembly for damping. In any of the various embodiments, the valve may be passively or actively actuated to transition from one position to another to restrict a flow of the lubricant or increase leakage of the lubricant. In this way, the valve controls the flow of lubricant through the damper such that only lubricant having a viscosity that is effective for damping is provided to the damper.

Advantages of the systems and methods described herein include reduction of time-at-idle restrictions for cold engine starts or in-flight re-starts. More particularly, known systems typically require that the engine idle for a specified period of time to allow the damper fluid to heat up such that its viscosity is suitable for damping. The systems and methods described herein allow such engine idle time to be reduced or eliminated. A further advantage of the systems and methods described herein is improved optimization of the damper design for bowed rotor starts or operational vibrations because no compromise for cold conditions is required in the damper design. Other advantages and benefits also may be achieved using the descriptions provided herein.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

FIG. 2 provides a schematic cross-sectional side view of an exemplary damper for a bearing assembly within the gas turbine engine illustrated in FIG. 1. As shown in FIG. 2, the damper 100 includes a damper housing 102 having a lubricant passage 104 defined therein. The lubricant passage 104 includes an inlet 106 and an outlet 108 and is defined by a first portion 104a and a second portion 104b. The first portion 104a of the lubricant passage 104 includes the inlet 106, and the second portion 104b of the lubricant passage 104 includes the outlet 108. The inlet 106 receives a flow of lubricant into the damper 100, e.g., from a lubricant storage area such as a tank, and the lubricant flows from or exits the damper 100 through the outlet 108. The lubricant may return to the lubricant storage area upon exiting the damper 100. The lubricant may be any suitable fluid for damping, e.g., oil or the like.

Further, the damper 100 is disposed radially outward of a bearing outer race 82 of a bearing assembly 80. The exemplary bearing assembly 80 supports a rotor of the turbofan engine 10, such as the high pressure shaft or spool 34 (i.e., the high pressure rotor 34). In the depicted embodiment, a pair of piston seal rings 84 seal a space 86 defined between the damper 100 and bearing assembly 80. As described above, the lubricant flows from the lubricant passage 104 into the space 86 to provide damping of the bearing assembly 80 and, more particularly, the rotor supported by the bearing assembly 80, for example, to mitigate and/or prevent propagation of rotor vibrations. In exemplary embodiments, the damper 100 is a fluid film or squeeze film damper, which provides a thin film of a lubricant such as oil within the space 86.

As illustrated in FIG. 2, a valve 110 is positioned within the lubricant passage 104 near the inlet 106. The valve 110 is configured to restrict a flow of lubricant from the inlet 106 when a reference temperature is below a threshold temperature. In the depicted exemplary embodiment, the valve 110 includes a stem 112 and a head 114. The head 114 has a shape complementary to a shape of the lubricant passage 104 such that, e.g., the valve head 114 may seat within the lubricant passage 104 to stop the flow of lubricant therethrough. More specifically, the valve 110 has a range of positions, from a fully open position to a fully closed position, which may be denoted as 100% open and 0% open, respectively, such that the position of valve 110 between fully open and fully closed may be expressed as a percentage of the fully open position (e.g., 90% open, 75% open, 30% open, etc.). Further, as shown in FIG. 2, the valve head 114 may be generally frustoconical in shape, and the portion of the lubricant passage 104 adjacent the head 114 may have a complementary frustoconical shape. However, in other embodiments, the head 114 and lubricant passage 104 may have other shapes.

The stem 112 of the valve 110 illustrated in FIG. 2 extends within a portion of the lubricant passage 104 upstream of the head 114. That is, a base end 112a of the stem 112 is closer to the inlet 106 than a head end 112b of the stem 112, at which the head 114 is attached. The valve 110 may be actively or passively actuated to transition between positions. As an example of a passively actuated embodiment, the valve stem 112 may be formed from a first material, the damper housing 102 may be formed from a second material, and the first material may have a higher coefficient of thermal expansion, or higher alpha ($\alpha$), than the second material such that there is an alpha mismatch between the materials. As such, the valve stem 112 contracts more at a low temperature than the damper housing 102. Accordingly, in the depicted embodiment, the valve 110 and lubricant passage 104 are configured such that the valve head 114 is in the fully closed or nearly fully closed position (e.g., 10% open or less) until the lubricant warms to a threshold temperature. At the threshold temperature, which corresponds to the coefficient of thermal expansion of the first material, the valve stem 112 begins to expand, which moves the head 114 such that the valve 110 transitions to a more open position (e.g., >10% open). As the lubricant continues to heat up, the stem 112 may continue to expand and move the head 114 until the valve 110 is in the fully open position (i.e., 100% open). It will be appreciated that the first material, i.e., the valve stem material, may be chosen such that the temperature at which the material begins to expand is generally the same as a temperature of the lubricant that is safe and/or useful for the damper 100. That is, the first material may be chosen such that the valve stem 112 does not begin to expand, and the valve 110 keeps the lubricant passage 104 substantially closed against the ingress of lubricant, until the lubricant is sufficiently warm to have a viscosity to effectively dampen vibrations transmitted through the bearing assembly 80. When the lubricant is sufficiently warm, the valve 110 opens or moves to a more open position to allow the lubricant to flow into the lubricant passage 104 such that the lubricant is available for damping. Although described above with respect to an alpha mismatch embodiment, other passive actuation mechanisms than using materials having different coefficients of thermal expansion also may be used.

Referring now to FIG. 3, in some embodiments, the valve is actively actuated such that the valve moves in response to a signal from a controller. More particularly, the turbofan engine 10 may be controlled by a controller 120. Control of a engine on an aircraft, such as turbofan engine 10, has evolved to use automated digital controls (e.g., a Full Authority Digital Engine Control (FADEC) on an aircraft). For example, the controller 120 (e.g., an Electronic Engine Controller (EEC) or Electronic Control Unit (ECU) of a FADEC) can control fuel flow, engine geometries, and other parameters to optimize performance of the engine 10 during operation, such as during takeoff, flight, and landing for an aircraft. Various parameters, such as the state of flight, state of aircraft systems, and pilot commands, can be communicated using digital signals from a system, such as an avionics system, to the controller 120. The controller 120 can include various components for performing various operations and functions. For example, the controller 120 can include one or more processor(s) and one or more memory device(s). The one or more memory device(s) can store instructions that when executed by the one or more processor(s) cause the one or more processor(s) to perform the operations and functions, e.g., as those described herein for communicating a signal. The controller 120 may be coupled to one or more signal communication devices 122 that, in turn, are coupled to an actuator 124. The actuator 124 is coupled to the valve 110 such that the actuator 124 actuates the valve 110 to vary its position. Any suitable actuator 124, such as a solenoid or the like, may be used to vary the position of valve head 114 with respect to its seat defined in the lubricant passage 104.

One or more temperature sensors 126 may be coupled to the controller 120 to provide temperature readings to the controller 120. For instance, a first temperature sensor 126a may sense an ambient air temperature outside of the turbofan engine 10, and a second temperature sensor 126b may sense a temperature of the lubricant. Based on the ambient air temperature and/or the temperature of the lubricant, the controller 120 may send one or more signals, which are communicated to the actuator 124 to control the position of the valve 110 and thereby control the flow of lubricant into the damper 100. For example, when a reference temperature is below a threshold temperature, the controller 120 sends a signal to the actuator 124 to position the valve 110 such that the valve head 114 is in the fully closed or nearly fully closed position (e.g., 10% open or less). The reference temperature may be the ambient air temperature sensed by the first temperature sensor 126a, or the reference temperature may be the lubricant temperature sensed by the second temperature sensor 126b.

Once the reference temperature is at or above the threshold temperature, the controller 120 sends a signal via the signal communication device(s) 122 to the actuator 124, which actuates the valve stem 112 to open the valve 110. The valve 110 may be opened to any sufficient percentage greater than the fully closed or nearly closed position, e.g., the valve 110 may be opened to any percentage greater than about 10% open. It will be appreciated that the valve 110 may be actuated to gradually open to the fully open position (i.e., 100% open) as the lubricant and/or the ambient air temperature continues to warm above the threshold temperature. As described above with respect to the passive actuation embodiment, the threshold temperature may be chosen such that the temperature at which the valve 110 begins to be opened is generally the same as a temperature at which the lubricant begins to be safe and/or useful for the damper 100. That is, the threshold temperature may be chosen such that the valve stem 112 is not actuated until the lubricant is sufficiently warm to have a viscosity to effectively dampen vibrations transmitted through the bearing assembly 80. As such, the threshold temperature may be an ambient air temperature (which indirectly indicates whether the lubricant is sufficiently warm to have a viscosity suitable for damping) or a lubricant temperature (which directly indicates whether the lubricant is sufficiently warm to have a viscosity suitable for damping).

The valve 110 may be actively actuated in other ways as well. For example, in some embodiments, the valve 110 is actively actuated such that the valve 110 moves in response to a manual input from a user. More particularly, a user (such as an aircraft pilot) may manipulate a control 128 such as a knob, switch, button, or the like to a first position when the reference temperature is below the threshold temperature. As previously described, the reference temperature may be the ambient air temperature or the lubricant temperature, and the threshold temperature may be an ambient air temperature or lubricant temperature at which the damper 100 begins to function effectively. In the first position of the control 128, the valve is in the fully closed or nearly closed position (e.g., <10% open). It will be appreciated that, if the valve is not in the fully or nearly closed position when the control 128 is manipulated to be in its first position, an actuator, such as the actuator 124, actuates the valve 110 such that the valve 110 moves to the fully or nearly closed position. When the reference temperature is at or above the threshold temperature, the user may manipulate the control 128 to a second position. When the control 128 is manipulated to be in its second position, the actuator 124 actuates the valve 110 to open the valve 110, e.g., position the valve 110 such that the valve is fully open (i.e., 100% open) or at least more than about 10% open. Of course, other means for actively actuating the valve 110 to transition between the fully open and fully closed positions may be used as well.

FIG. 4 provides a schematic cross-sectional side view of a damper for a bearing assembly within the gas turbine engine illustrated in FIG. 1, according to another exemplary embodiment of the present subject matter. As shown in FIG. 4, the damper 200 is similar to the damper 100 illustrated in FIGS. 2 and 3. More particularly, the damper 200 includes a damper housing 202 having a lubricant passage 204 defined therein. The lubricant passage 204 includes an inlet 206 and an outlet 208 and is defined by a first portion 204a and a second portion 204b. The first portion 204a of the lubricant passage 204 includes the inlet 206, and the second portion 204b of the lubricant passage 204 includes the outlet 208. The inlet 206 receives a flow of lubricant into the damper 200, e.g., from a lubricant storage area such as a tank, and the lubricant flows from or exits the damper 200 through the outlet 208. The lubricant may return to the lubricant storage area upon exiting the damper 200.

Further, like the damper 100, the damper 200 may be disposed radially outward of the bearing outer race 82 of the bearing assembly 80. As previously described, the exemplary bearing assembly 80 supports a rotor of the turbofan engine 10, such as the high pressure shaft or spool 34 (i.e., the high pressure rotor 34). In the depicted embodiment, a pair of piston seal rings 84 seal a space 86 defined between the damper 200 and bearing assembly 80. As described above, the lubricant flows from the lubricant passage 204 into the space 86 to provide damping of the bearing assembly 80 and, more particularly, the rotor supported by the bearing assembly 80, for example, to mitigate and/or prevent propagation of rotor vibrations. In exemplary embodiments, the damper 200 is a fluid film or squeeze film damper, which provides a thin film of a lubricant such as oil within the space 86.

As illustrated in FIG. 4, a valve 210 is positioned within the lubricant passage 204 near the outlet 208. The valve 210 is configured to increase leakage of a lubricant through the outlet 208 when a reference temperature is below a threshold temperature. In the depicted exemplary embodiment, the valve 210 includes a stem 212 and a head 214. The head 214 has a shape complementary to a shape of the lubricant passage 204 such that, e.g., the valve head 214 may seat within the lubricant passage 204 to stop the flow of lubricant therethrough. More specifically, the valve 210 has a range of positions, from a fully open position to a fully closed position, which may be denoted as 100% open and 0% open, respectively, such that the position of valve 210 between fully open and fully closed may be expressed as a percentage of the fully open position (e.g., 90% open, 75% open, 30% open, etc.). Further, as shown in FIG. 4, the valve head 214 may be generally frustoconical in shape, and the portion of the lubricant passage 204 adjacent the head 214 may have a complementary frustoconical shape. However, in other embodiments, the head 214 and lubricant passage 204 may have other shapes.

The stem 212 of the valve 210 illustrated in FIG. 4 extends within a portion of the lubricant passage 204 downstream of the head 214. That is, a base end 212a of the stem 212 is closer to the outlet 208 than a head end 212b of the stem 212, at which the head 214 is attached. Like the valve 110 described above with respect to damper 100, the valve 210 may be actively or passively actuated to transition between positions. As an example of a passively actuated embodiment, the valve stem 212 may be formed from a first material, the damper housing 202 may be formed from a second material, and the first material may have a higher coefficient of thermal expansion, or higher alpha ($\alpha$), than the second material such that there is an alpha mismatch between the materials. As such, the valve stem 212 contracts more at a low temperature than the damper housing 202. Accordingly, in the depicted embodiment, the valve 210 and lubricant passage 204 are configured such that the valve head 214 is in the fully open or nearly fully open position (e.g., 90% open or more) until the lubricant warms to a threshold temperature. At the threshold temperature, which corresponds to the coefficient of thermal expansion of the first material, the valve stem 212 begins to expand, which moves the head 214 such that the valve 210 transitions to a more closed position (e.g., <90% open). As the lubricant continues to heat up, the stem 212 may continue to expand and move the head 214 until the valve 210 is in the fully closed position (i.e., 0% open). It will be appreciated that the first material, i.e., the valve stem material, may be chosen such that the temperature at which the material begins to expand is generally the same as a temperature of the lubricant that is safe and/or useful for the damper 200. That is, the first material may be chosen such that the valve stem 212 does not begin to expand, and the valve 210 keeps the lubricant passage 204 substantially open, until the lubricant is sufficiently warm to have a viscosity to effectively dampen vibrations transmitted through the bearing assembly 80. When the lubricant is sufficiently warm, the valve 210 closes or moves to a less open position to decrease leakage of the lubricant from the lubricant passage 204 such that the lubricant is available for damping. When the valve 210 is substantially closed, flow through the damper may be maintained by controlled leakage across the valve head 214, the piston rings 84, or other exits. Although described above with respect to an alpha mismatch embodiment, other passive actuation mechanisms than using materials having different coefficients of thermal expansion also may be used.

Referring now to FIG. 5, in some embodiments, the valve is actively actuated such that the valve moves in response to a signal from a controller. More particularly, as described with respect to FIG. 3, the turbofan engine 10 may be controlled by a controller 120, such as an Electronic Engine Controller (EEC) or Electronic Control Unit (ECU) of a FADEC. As previously described, the controller 120 can include various components for performing various operations and functions. For example, the controller 120 can include one or more processor(s) and one or more memory device(s). The one or more memory device(s) can store instructions that when executed by the one or more processor(s) cause the one or more processor(s) to perform the operations and functions, e.g., as those described herein for communicating a signal. The controller 120 may be coupled to one or more signal communication devices 122 that, in turn, are coupled to an actuator 124. The actuator 124 is coupled to the valve 210 such that the actuator 124 actuates the valve 210 to vary its position. Any suitable actuator 124, such as a solenoid or the like, may be used to vary the position of valve head 214 with respect to its seat defined in the lubricant passage 204.

Further, one or more temperature sensors 126 may be coupled to the controller 120 to provide temperature readings to the controller 120, such as the first temperature sensor 126a for sensing the ambient air temperature outside and the second temperature sensor 126b for sensing the temperature of the lubricant. Based on the ambient air temperature and/or the temperature of the lubricant, the controller 120 may send one or more signals, which are communicated to the actuator 124 to control the position of the valve 210 and thereby control the flow of lubricant through the damper 200. For example, when a reference temperature is below a threshold temperature, the controller 120 sends a signal to the actuator 124 to position the valve 210 such that the valve head 214 is in the fully open or nearly fully open position (e.g., 90% open or more). The reference temperature may be the ambient air temperature sensed by the first temperature sensor 126a, or the reference temperature may be the lubricant temperature sensed by the second temperature sensor 126b.

Once the reference temperature is at or above the threshold temperature, the controller 120 sends a signal via the signal communication device(s) 122 to the actuator 124, which actuates the valve stem 212 to close the valve 210. The valve 210 may be closed to any sufficient percentage less than the fully open or nearly fully open position, e.g., the valve 210 may be closed to any percentage less than about 90% open. It will be appreciated that the valve 210 may be actuated to gradually close to the fully closed position (i.e., 0% open) as the lubricant and/or the ambient air temperature continues to warm above the threshold temperature. As described above with respect to the passive actuation embodiment, the threshold temperature may be chosen such that the temperature at which the valve 210 begins to be closed is generally the same as a temperature at which the lubricant begins to be safe and/or useful for the damper 200. That is, the threshold temperature may be chosen such that the valve stem 212 is not actuated until the lubricant is sufficiently warm to have a viscosity to effectively dampen vibrations transmitted through the bearing assembly 80. As such, the threshold temperature may be an ambient air temperature (which indirectly indicates whether the lubricant is sufficiently warm to have a viscosity suitable for damping) or a lubricant temperature (which directly indicates whether the lubricant is sufficiently warm to have a viscosity suitable for damping).

The valve 210 may be actively actuated in other ways as well. For example, in some embodiments, the valve 210 is actively actuated such that the valve 210 moves in response to a manual input from a user. More particularly, as described with respect to the damper 100, a user (such as an aircraft pilot) may manipulate a control 128 such as a knob, switch, button, or the like to a first position when the reference temperature is below the threshold temperature. As previously described, the reference temperature may be the ambient air temperature or the lubricant temperature, and the threshold temperature may be an ambient air temperature or lubricant temperature at which the damper 200 begins to function effectively. In the first position of the control 128, the valve is in the fully open or nearly fully open position (e.g., >90% open). It will be appreciated that, if the valve is not in the fully or nearly fully open position when the control 128 is manipulated to be in its first position, an actuator, such as the actuator 124, actuates the valve 210 such that the valve 210 moves to the fully or nearly fully open position. When the reference temperature is at or above the threshold temperature, the user may manipulate the control 128 to a second position. When the control 128 is manipulated to be in its second position, the actuator 124 actuates the valve 210 to close the valve 110, e.g., position the valve 210 such that the valve is fully closed (i.e., 0% open) or at least less than about 90% open. Of course, other means for actively actuating the valve 210 to transition between the fully open and fully closed positions may be used as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A damper for a bearing assembly of a gas turbine engine, comprising:
    a damper housing;
    a lubricant passage defined in the damper housing, the lubricant passage including an inlet and an outlet; and
    a valve positioned within the lubricant passage, the valve comprising a stem and a head, the stem having a base end opposite a head end, the head disposed at the head end of the stem, the head having a shape complementary to a shape of the lubricant passage to block a flow of lubricant through the lubricant passage, wherein the valve is configured to restrict the flow of lubricant from the inlet into the damper when a reference temperature is below a threshold temperature, and wherein the base end of the stem is disposed adjacent the inlet such that the stem extends within the lubricant passage upstream of the head.

2. The damper of claim 1, wherein the valve is actively actuated such that the valve moves in response to a signal from a controller.

3. The damper of claim 1, wherein the valve is actively actuated such that the valve moves in response to a manual input from a user.

4. The damper of claim 1, wherein the valve is passively actuated.

5. The damper of claim 1, wherein the reference temperature is a temperature of the lubricant.

6. The damper of claim 1, wherein the reference temperature is an ambient air temperature.

7. A damper for a bearing assembly of a gas turbine engine, comprising:
   a damper housing;
   a lubricant passage defined in the damper housing, the lubricant passage including an inlet and an outlet; and
   a valve positioned within the lubricant passage, the valve comprising a stem and a head, the stem having a base end opposite a head end, the head disposed at the head end of the stem, the head having a shape complementary to a shape of the lubricant passage to block a flow of lubricant through the lubricant passage,
   wherein the valve is configured to increase leakage of a lubricant through the outlet when a reference temperature is below a threshold temperature, and
   wherein the base end of the stem is disposed adjacent the outlet such that the stem extends within the lubricant passage downstream of the head.

8. The damper of claim 7, wherein the valve is actively actuated such that the valve moves in response to a signal from a controller.

9. The damper of claim 7, wherein the valve is actively actuated such that the valve moves in response to a manual input from a user.

10. The damper of claim 7, wherein the valve is passively actuated.

11. The damper of claim 7, wherein the reference temperature is a temperature of the lubricant.

12. The damper of claim 7, wherein the reference temperature is an ambient air temperature.

13. A damper for a bearing assembly of a gas turbine engine, comprising:
    a damper housing;
    a lubricant passage defined in the damper housing, the lubricant passage including an inlet and an outlet; and
    a passively actuated valve positioned within the lubricant passage, the valve comprising a stem and a head that are both disposed in the lubricant passage, the stem having a base end opposite a head end, the head disposed at the head end of the stem, the head having a shape complementary to a shape of the lubricant passage to block a flow of lubricant through the lubricant passage,
    wherein the valve is configured to move within the lubricant passage to control the flow of lubricant from the inlet to the outlet based on a reference temperature, and
    wherein the stem of the valve is formed from a first material and the damper housing is formed from a second material, the first material having a higher coefficient of thermal expansion than the second material.

14. The damper of claim 13, wherein the valve is configured to move within the lubricant passage to restrict a flow of lubricant from the inlet when the reference temperature is below a threshold temperature.

15. The damper of claim 13, wherein the valve is configured to move within the lubricant passage to increase leakage of the lubricant through the outlet when the reference temperature is below a threshold temperature.

16. The damper of claim 13, wherein the reference temperature is a temperature of the lubricant.

17. The damper of claim 13, wherein the lubricant is oil and the damper provides a thin film of the oil within the bearing assembly.

18. The damper of claim 13, wherein the base end of the stem is disposed adjacent the inlet.

19. The damper of claim 13, wherein the base end of the stem is disposed adjacent the outlet.

20. The damper of claim 13, wherein the valve is disposed downstream of the bearing assembly.

* * * * *